US009273633B2

(12) United States Patent
Spangler

(10) Patent No.: US 9,273,633 B2
(45) Date of Patent: *Mar. 1, 2016

(54) APPARATUS AND METHOD FOR A SOLID CATALYST AND FLUID DYNAMIC ERUPTION REACTION

(71) Applicant: Steven D. Spangler, Englewood, CO (US)

(72) Inventor: Steven D. Spangler, Englewood, CO (US)

( * ) Notice: Subject to any disclaimer, the term of this patent is extended or adjusted under 35 U.S.C. 154(b) by 112 days.

This patent is subject to a terminal disclaimer.

(21) Appl. No.: 14/048,749

(22) Filed: Oct. 8, 2013

(65) Prior Publication Data

US 2014/0102074 A1   Apr. 17, 2014

Related U.S. Application Data

(63) Continuation of application No. 13/181,155, filed on Jul. 12, 2011, now Pat. No. 8,550,379, which is a continuation-in-part of application No. 13/176,596, filed on Jul. 5, 2011, which is a continuation of application No. 11/623,246, filed on Jan. 15, 2007, now Pat. No. 7,971,801.

(60) Provisional application No. 60/853,663, filed on Oct. 23, 2006.

(51) Int. Cl.
| | |
|---|---|
| *B05B 9/00* | (2006.01) |
| *F02K 7/08* | (2006.01) |
| *G09B 23/12* | (2006.01) |
| *G09B 23/24* | (2006.01) |
| *A63F 9/00* | (2006.01) |

(52) U.S. Cl.
CPC . *F02K 7/08* (2013.01); *G09B 23/12* (2013.01); *G09B 23/24* (2013.01); *A63F 2009/0013* (2013.01)

(58) Field of Classification Search
CPC ...... A63H 27/005; A63H 33/20; B05B 7/247; B05B 7/243; B05B 7/005; B05B 1/3033; B05B 1/30
USPC ........... 239/325, 379, 401, 407, 581.2, 582.1, 239/569; 222/145.1, 145.5, 129; 206/219–221; 446/51, 52, 231
See application file for complete search history.

(56) References Cited

U.S. PATENT DOCUMENTS

| | | | |
|---|---|---|---|
| 1,367,381 A | 2/1921 | Hofer | |
| 1,897,709 A | 2/1933 | Nigeradse | |

(Continued)

FOREIGN PATENT DOCUMENTS

WO     WO0213937 A    2/2002

OTHER PUBLICATIONS

EepyBlog, At the Webby Awards, posted Jun. 4, 2007, retrieved from the internet on Jan. 7, 2009, http://eepybird.com/blog.html.

(Continued)

*Primary Examiner* — Davis Hwu
(74) *Attorney, Agent, or Firm* — Peter B. Scull; Hamilton, DeSanctis & Cha LLP

(57) ABSTRACT

An apparatus and method for use in conducting an eruption reaction are disclosed. The apparatus includes a catalytic solids container with a mouth and fluid egress opening and a trigger device or mechanism that allows for the controlled release of a catalytic solid into an eruptible fluid. The catalytic solids container may be adapted to be coupled to a container for an eruptible fluid.

20 Claims, 11 Drawing Sheets

(56) References Cited

U.S. PATENT DOCUMENTS

| | | | |
|---|---|---|---|
| 2,281,229 | A | 4/1943 | Bullock |
| 2,856,725 | A | 10/1958 | Kenline |
| 3,013,699 | A | 12/1961 | Meuwly |
| 3,070,094 | A | 12/1962 | Sarnoff et al. |
| 3,156,369 | A | 11/1964 | Bowes et al. |
| 3,326,400 | A | 6/1967 | Jean et al. |
| 3,715,189 | A | 2/1973 | Nighohossian et al. |
| 3,961,756 | A | 6/1976 | Martini |
| 4,038,776 | A * | 8/1977 | Filipeli .................... 446/52 |
| 4,059,917 | A | 11/1977 | Sims et al. |
| 4,122,943 | A | 10/1978 | Silver et al. |
| 4,315,570 | A | 2/1982 | Silver et al. |
| 5,389,030 | A | 2/1995 | Chapkis |
| 5,597,160 | A | 1/1997 | Mims |
| 5,654,523 | A | 8/1997 | Brunn |
| 5,692,945 | A | 12/1997 | Crowell et al. |
| 5,836,479 | A | 11/1998 | Klima et al. |
| 6,776,315 | B1 | 8/2004 | Laulom et al. |
| 6,808,436 | B1 * | 10/2004 | Siu .................... 446/231 |
| 7,055,709 | B1 | 6/2006 | Esau |
| 7,288,016 | B2 | 10/2007 | Juy |
| 7,971,801 | B2 | 7/2011 | Spangler |
| 8,550,379 | B2 * | 10/2013 | Spangler .................... 239/379 |
| 2006/0278115 | A1 | 12/2006 | Juy |
| 2008/0076321 | A1 | 3/2008 | Voltz et al. |
| 2014/0042237 | A1 | 2/2014 | Voltz et al. |

OTHER PUBLICATIONS

Extreme Diet Coke & Mentos Experiments II Trailer, published Oct. 18, 2006, best available first page printed and retrieved from the internet on Jan. 7, 2009, http://video.google.com/videoplay?docid=-2723280415645626938.

International Search Report (ISR) and Written Opinion for International Application No. PCT/US2007/082287, International Filing Date Oct. 23, 2007, Date of Mailing ISR Jul. 16, 2008, 8 pages, United States Patent Office, Alexandria Virginia.

Mentos and Diet Coke 5 min Pete Show; Aug. 9, 2006; http://www.dailymotion.com/video/xa2zz_the-5-min-show-ep-31_creation (.MOV format) (Reference not included with this submission. Reference can be found in corresponding parent U.S. Appl. No. 11/623,246, now U.S. Pat. No. 7,971,801.

Mentos and Diet Coke Experiments; Aug. 22, 2006; www.eepybird.com shown at www.archive.com; http://web.archive.org/web/20060822141601/http://eepybird.com/index.html (.MOV format).

Mentos and Diet Coke Experiments; Jun. 9, 2006; www.eepybird.com shown at www.archive.com; http://web.archive.org/web/20060609235226/http://eepybird.com/index.html (.MOV format).

Office Action, dated Aug. 30, 2010, U.S. Appl. No. 11/859,542, Voltz, filed Sep. 21, 2007.

Polly Leider, Weird Science: Mentos + Soda, Apr. 18, 2006, The Early Show—CBS News.

Steve Spangler News9 Denver Mentos Fountains; Jun. 2006; http://www.stevespanglerscience.com/content/science-video/mentos-fountain-trigger-device (MPEG format) (Reference not included with this submission. Reference can be found in corresponding U.S. Appl. No. 11/623,246, now U.S. Pat. No. 7,971,801.

Steve Spangler News9 Denver Mentos Geyser Backyard; Sep. 2005; http://www.stevespanglerscience.com/experiment/00000109 (MPEG format).

Steve Spangler News9 Denver Mentos Geyser; 2002 ("the year of publication is sufficiently earlier than the effective U.S. filing date and any foreign priority date so that the particular month of publication is not in issue"); http://www.youtube.com/watch?v=yVQFLih4ylQ (.MOV format).

Steve Spangler Unwrapped Mentos Geyser Tube Food Network; Dec. 2006; http://www.youtube.com/watch?V=Gwq8NXYLNf8 (MPEG format).

The Disgruntled Chemist, Diet Coke and Mentos: An Experimental Study, The Disgruntled Chemist, Apr. 28, 2006, http://lhedisgruntled.blogspot.com/2006/04/diet-coke-and-mentos-experimental.html.

Video Google, Extreme Diet Coke & Mentos Experiments II—Trailer, Oct. 18, 2006, http://video.google.com/videosearch?q=extreme+diet+coke+and+mentos+experiments+II+trailer&hl=en&emb=O&aq=f#.

Wikipedia, Diet Coke and Mentos Eruption, retrieved from the internet on Sep. 28, 2008, http://en.wikipedia.org/wiki/Diet_Coke_and_Mentos.

Mentos and Diet Coke 5 min Pete Show; Aug. 9, 2006; http://www.dailymotion.com/video/xa2zz_the-5-min-showep-31_creation (.MOV format).

* cited by examiner

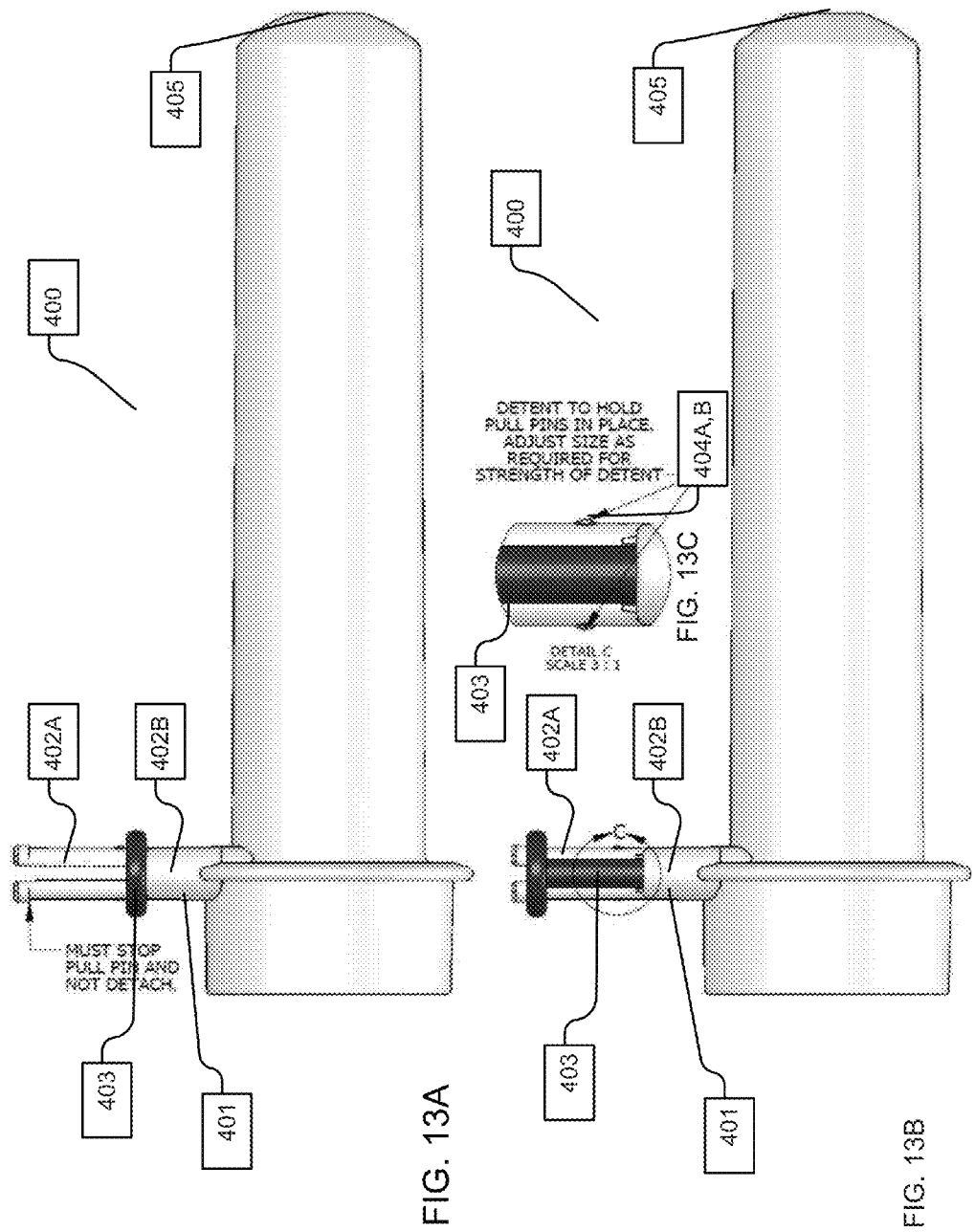

APPARATUS AND METHOD FOR A SOLID CATALYST AND FLUID DYNAMIC ERUPTION REACTION

CROSS-REFERENCE TO RELATED APPLICATIONS

The present application is a continuation of and claims priority from U.S. Nonprovisional application Ser. No. 13/181,155, filed Jul. 12, 2011, which is a Continuation in Part Patent Application of and which claims priority from U.S. Nonprovisional application Ser. No. 13/176,596, filed Jul. 5, 2011, which claims priority from U.S. Nonprovisional application Ser. No. 11/623,246, filed Jan. 15, 2007, now U.S. Pat. No. 7,971,801 issued Jul. 5, 2011 which claims priority from the U.S. Provisional Application No. 60/853,663, filed 23 Oct. 2006, entitled "APPARATUS AND METHOD FOR A SOLID CATALYST AND FLUID DYNAMIC ERUPTION REACTION"; the subject matter of all of which hereby being specifically incorporated herein by reference for all that they disclose and teach.

BACKGROUND

Apparatuses and methods hereof relate generally to science toys and/or teaching devices, and more particularly to toys or devices that can be used for conducting, presenting and/or observing science experiments involving erupting fluids.

Experimenters have used various devices and/or methods for conducting fluid dynamic experiments or presentations involving an eruption of a fluid from a container. In situations where a solid catalyst may be dropped into an eruptible fluid to cause an eruption of that fluid, the methodological examples may range from simply manually dropping one or more solid reaction-causing articles, such as candy, directly into a bottle filled with an eruptible fluid such as soda, to using specific types of aids or devices for putting a catalytic solid in contact with an eruptible fluid. For example, experimenters have used devices such as metal or plastic tubes or a piece of paper rolled into a tube, or other containers, for holding one or more catalytic solids then, simply positioning these relative to the fluid and dropping the solids into eruptible fluid. Other previous methods for orchestrating such an eruptive solid/liquid reaction involve disposing a catalytic solid within such a tube or tubing and retaining this therein with a playing-card or other discrete, flat triggering device. However, due to the rapid nature of some such reactions and subsequent eruptions, currently available methods and devices have often offered inadequate control over the timing or results of such a reaction. In many such reactions, any of these prior methods would require dexterity and quickness in removal of the tube or other holding device to avoid interference with the liquid 'geyser' that can shoot tens of feet up into the air.

SUMMARY

Disclosed here is an apparatus and a method for an eruption reaction involving a catalytic solid and an eruptible fluid. An apparatus hereof may include a body portion for holding a catalytic solid, the body portion having a mouth at a first end and a fluid egress opening at a second end. The apparatus may also include a trigger mechanism operatively connectable to the body portion, the trigger mechanism adapted to alternately retain and release the catalytic solid relative to the body portion. The body portion may also be adapted to be coupled to the mouth of a container of an eruptible fluid.

BRIEF DESCRIPTION OF THE DRAWINGS

Apparatuses and methods hereof will be better understood by reference to the following more detailed description and accompanying drawings in which:

FIG. 13, which includes sub-part FIGS. 13A, 13B and 13C, provides side views of an apparatus like that in FIG. 1 and FIGS. 11-12, showing an alternative retention/trigger component integrated with the apparatus; FIG. 13C being a cut-away enlarged view taken from FIG. 13B.

DETAILED DESCRIPTION

Figure 1:
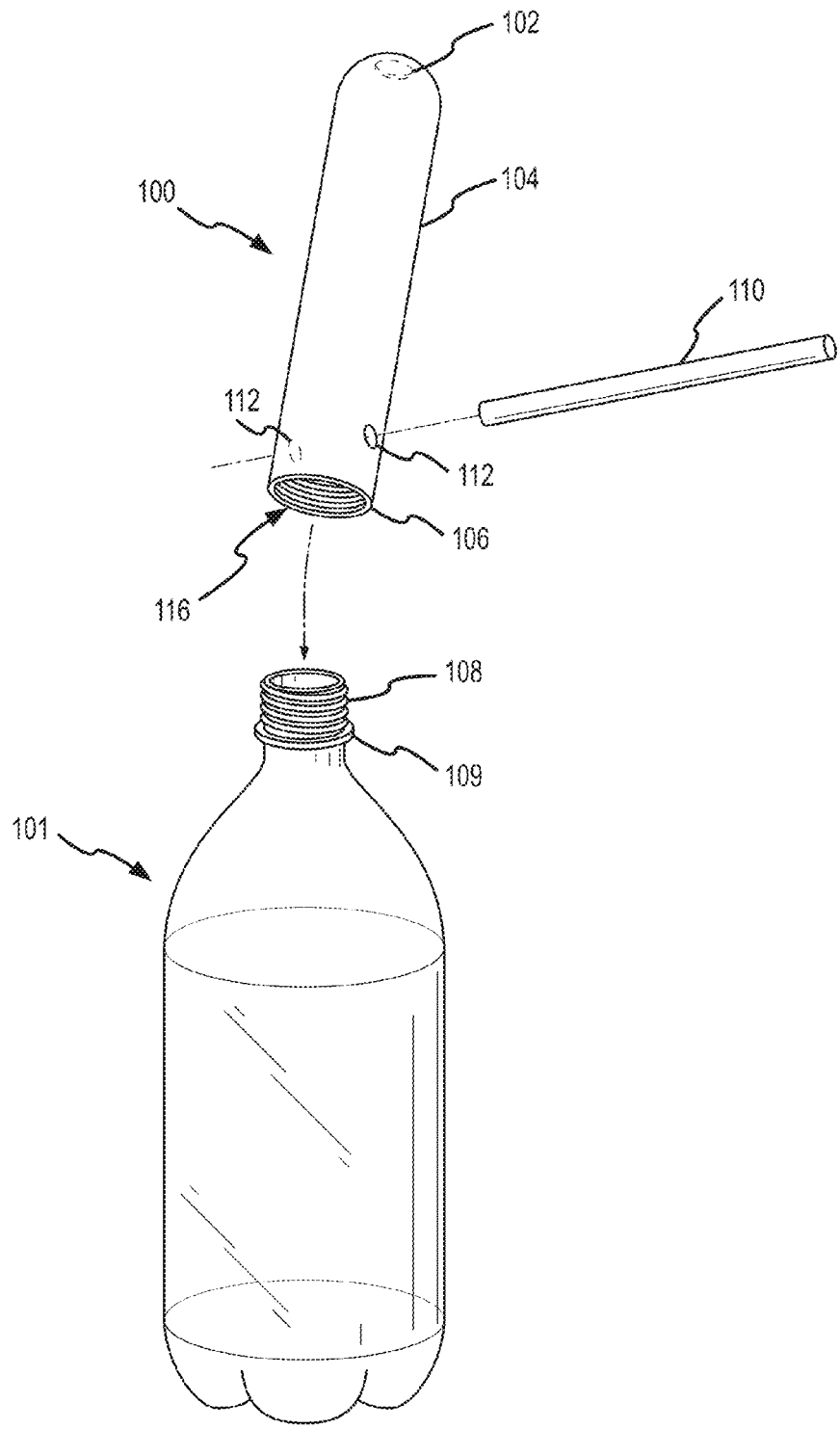
FIG. 1 is an isometric view of an implementation of an apparatus for manipulation of a fluid dynamic eruption reaction.

Described here are apparatuses and methods for catalytic solid and eruptible fluid eruption reactions, and particularly for manipulation and/or control thereof. Accordingly, such an apparatus 100, also referred to in some instances, as an eruption manipulation apparatus 100, is illustrated, for example in FIG. 1, and may advantageously be used for conducting, observing and/or manipulating science experiments involving erupting fluids. The apparatus 100 may be particularly adapted for use with an otherwise fluid container such as a conventional soda bottle 101 as described herein. As such the apparatus 100 may provide for controlled delivery of an eruption reaction solid article to an eruptible fluid contained within the bottle 101 or other eruptible fluid container 101. Such a controlled delivery may provide for desirable eruption results.

An apparatus 100 for manipulating or triggering a solid catalyst/dynamic fluid eruption reaction according hereto may in many implementations include two (2) parts: a container or body portion for containing the solid catalyst, and a trigger device or mechanism disposed in operative relation to the container or body portion. The body portion may have a capacity for receiving a stack of one or a number of solid reaction-causing articles. The trigger structure may allow for direct and/or remote deployment of the one or more solid reaction-causing articles into a reactionary fluid. Typically, the apparatus may be a beverage container attachment, and, the solid reaction-causing article can be a candy, e.g., a Mentos® mint, and the reactionary fluid can be a carbonated soda beverage, e.g., Diet Coke® cola. Accessories and/or alternatives can be provided for use with the apparatus for directing and/or enhancing the nature and direction of the eruption. A method for use of the apparatus is also described.

The apparatus 100 is here shown including a substantially cylindrical and substantially rigid body portion 104 with a small aperture 102, also referred to as a fluid egress opening, at one end, and a larger aperture 116, also referred to as a mouth, at the other end. Body portion 104 may also be referred to as a container 104 herein. A substantially rigid mouth portion 106 defined by and/or including the larger aperture 116 is, in this implementation, intended to couple the apparatus 100 to the threaded mouth 108 of a soda bottle 101 in operable communication therewith. Operable communication may include providing for the movement or transfer of one or more solids from the apparatus to the container 101, and/or for communication of a fluid from the container to and through the apparatus 100. As such, the mouth portion 106 may be internally threaded as shown, in a fashion corresponding to or mating with the external threading of the conventional soda bottle 101. A soda bottle collar or flange 109 may, inter alia, serve to limit the extent of the threaded connection of the eruption manipulation apparatus 100 to the soda bottle 101.

A solids retention and/or trigger component 110, also alternatively referred to either as a retention component, a trigger component or as a retention trigger component 110, may be used to retain one or more solid catalyst articles such as candy within the container 104 until a triggered release thereof is desired. As such, a retention trigger component 110 may be inserted into one or more laterally positioned holes 112, also sometimes referred to as respective holes 112a, 112b, one each disposed on either side of the apparatus 100 adjacent the threaded mouth portion 106. In an alternative implementation, a single hole 112 may be used so long as either: the triggering component is sufficiently configured to retain articles 114 without a second hole, or that the wall of the body portion 104 is thick enough at that point to provide a sufficient cantilevering effect for the elongated member of the trigger component when this is inserted therein, inter alia.

Figure 2:
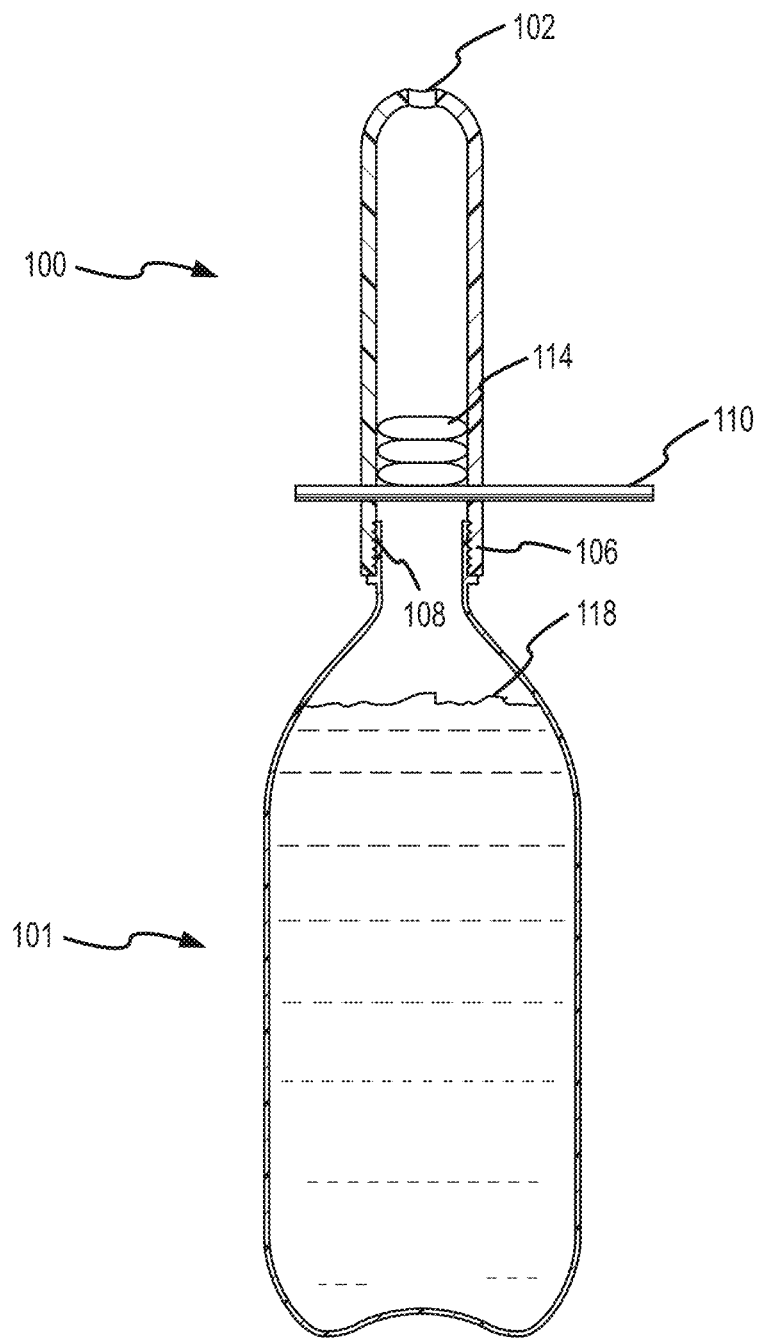
FIG. 2 is a cross-sectional view of an apparatus like that shown in FIG. 1 with a retention/trigger component in place and the apparatus attached to a bottle.

In an implementation hereof as shown for example in FIG. 2, an eruption manipulation apparatus 100 is attached to an eruptible fluid containing bottle 101, and is ready for use. Such a coupling of an apparatus 100 and a soda bottle 101 allows for the catalytic solid, e.g., candy, to move in seamless transition from the container 104 to the soda bottle 101. However, prior to such an attachment of the apparatus 100 to the soda bottle mouth 108, the container or body portion 104 is loaded with one or more catalytic solids 114, such as certain types of candy, see further description hereof below. These one or more solids 114 may be inserted into and stacked within the body portion 104 through the larger aperture 116. The trigger component 110 may then be inserted through the one or more holes 112, and by thus extending into and in many cases projecting through the apparatus 100, this secures the catalytic solids in place within the apparatus 100, thus allowing the apparatus 100 to be turned over and coupled to the mouth 108 of the soda bottle 101. This isolates the solid catalyst(s) in a secured and readily deployable position above the eruptible fluid 118, e.g., soda, within the bottle 101.

Figures 3, 4:
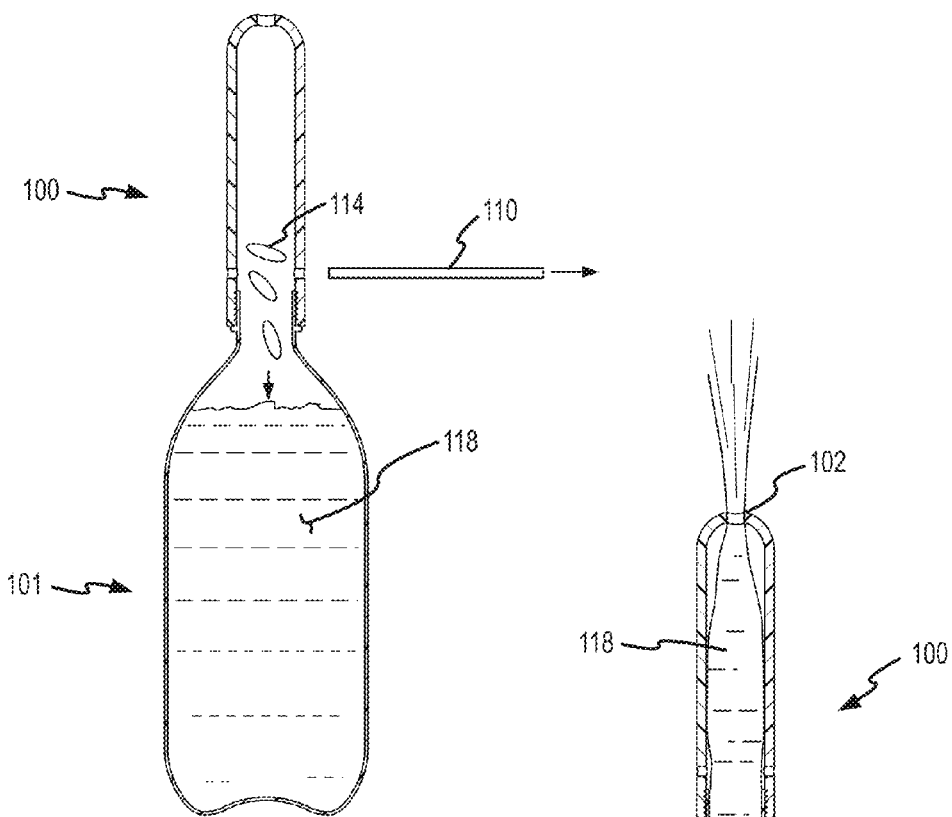
FIG. 3 is a cross-sectional view of an apparatus like that shown in FIG. 1 with a retention/trigger component moved and a solid catalyst falling into an eruptible fluid within the bottle.
FIG. 4 is a cross-sectional view of an apparatus like that shown in FIG. 1 illustrating the eruptive consequence of the solid catalyst/eruptible fluid reaction.

A protruding portion of the trigger component may then be directly or remotely pulled to effect removal or at least substantial withdrawal of the trigger component from the container 104 as shown in FIG. 3 (complete withdrawal is not required). Once the trigger component 110 is moved in such fashion, the catalytic solid or solids 114 fall downward through the aperture 116 and into the eruptible fluid 118. Once the catalytic solids 114 contact the fluid 118, the eruption reaction begins, as illustrated in FIG. 4. More particularly, as the catalytic solids 114 fall into and disperse within and through the fluid 118, gases are generated at a high rate, and the forces of the gas generating reactions cause the eruptible fluid 118 to quickly flow or move upward and outward through the mouth 108 of the bottle and into and through the apparatus 100 and ultimately exit through the aperture 102 into the outer environment. The aperture 102 can be modified in shape and size to direct propulsion of the soda upward and/or outward in many alternative configurations. A plurality of holes or one or more transverse slices could alternatively be used as well. Indeed, one or more holes could be disposed in the lateral sidewalls as well.

Note, either a direct or a remote triggering option may be used to move the trigger component 110. For example, an experimenter may manually grasp the protruding portion of the trigger component 110 and pull, or the protruding portion may be otherwise moved as by or through connection of a string or other elongated member (neither shown) to allow the experimenter to deploy the catalyst from a relatively remote location away from the reaction to avoid direct or indirect contact with the eruption.

In many instances, the catalytic solid may be a candy such as Mentos® brand mints (available from Perfetti van Melle Italia, S.r.l., Milan, Italy), and the eruptible fluid may be a carbonated beverage such as soda pop, particularly diet sodas such as a Diet Coke® cola (available from the Coca-Cola Company, Atlanta, Ga., USA). The reaction may be caused by either or both of a chemical reaction or a physical or mechanical reaction. Chemically, a soda beverage may be basically sugar or diet sweetener, flavoring, water and preservatives such as sodium benzoate. The bubbles in carbonated beverages are typically from carbon dioxide gas, which is pumped into bottles at the bottling factory using a large amount of pressure, the bubbles then being dissolved into the soda solution. Until opened, the gas mostly stays suspended in the liquid in the bottle (or other container) and cannot expand to form more bubbles, which gases naturally do. However, a shaken bottle with a carbonated beverage which is then opened, provides for a quick release of the gas from the protective hold of the water molecules, the soda then being able to erupt and escapes from the bottle, taking some of the soda along with it. Other causes of escape for the gas from solution may occur when something is dropped into a glass of soda, bubbles immediately forming on the surface of the object. In such an example, adding salt to soda causes it to foam up because thousands of little bubbles form on the surface of each grain of salt.

Many scientists believe that a candy soda reaction or phenomenon such as that described here is a physical reaction, rather than a chemical one. Water molecules strongly attract each other, linking together to form a tight mesh around each bubble of carbon dioxide gas in the soda. In order to form a new bubble, or even to expand a bubble that has already formed, water molecules must push away from each other. It takes extra energy to break this "surface tension." In other words, water "resists" the expansion of bubbles in the soda. When a candy such as Mentos® is dropped into the soda, the gelatin and gum arabic from the dissolving candy may break the surface tension. This may then disrupt the water mesh, so that it takes less work to expand and form new bubbles. Each Mentos® candy piece has thousands of tiny pits all over the surface. These tiny pits may also be referred to as nucleation sites, or, places for carbon dioxide bubbles to form. Thus, as soon as the Mentos® candy piece comes into contact with the soda, bubbles may start to form all over the surface of the candy piece at and due to these nucleation sites. Couple this with the fact that the Mentos® candies are heavy and sink to the bottom of the bottle and an additional causation factor may be in action. In particular, when the gas is generated and released from the carbonated fluid, it may push upward on the liquid thereabove, to push it up and out of the bottle in an incredible eruption. Similar effects may occur during the cooking of potatoes or pasta in a pot of boiling water. The boiling water will sometimes boil over because organic materials that leach out of the cooking potatoes or pasta disrupt the tight mesh of water molecules at the surface of the water, making it easier for bubbles and foam to form, thus erupting out of the pot. Further similarly, a scoop of ice cream added to a soda such as root beer can cause a foam that foams in and perhaps out of the container for essentially the same reason. The surface tension of the soda may be lowered by gums and proteins from the melting ice cream, and the CO2 bubbles expand and release easily, creating an erupting foam on top.

An apparatus 100 hereof can be constructed in any suitable and/or conventional manner, e.g., by injection molding, using any suitable and/or conventional materials, e.g., high-impact plastic or acrylic. Other materials and construction methods could alternatively be used. The apertures 102 and 112 and/or 116 may be created by a bore or a saw capable of precisely cutting through the device material e.g. high-impact plastic or acrylic. The threading 106 can be created by during the injection molding process in connection with construction of apparatus 100, above, or by cutting them into the plastic using known techniques. Further, the trigger component 110 can be constructed using any conventional materials, e.g., this may be a rod, dowel, toothpick or other substantially cylindrical wooden stick, a plastic or acrylic wand, or may be a substantially flat or flattened or other shaped devices as well. In some implementations, a disk shape or some other non-elongated, perhaps polygonal shape may be used. In an alternative implementation, a trigger retention device may be hingedly connected within the body portion of the apparatus and triggered as a flap or trap door which may be pulled downwardly as by a string or by other means to open the communicable passage between the body portion and the fluid container for the transmission of the catalytic solid(s) from the apparatus to the fluid container.

Figure 5:
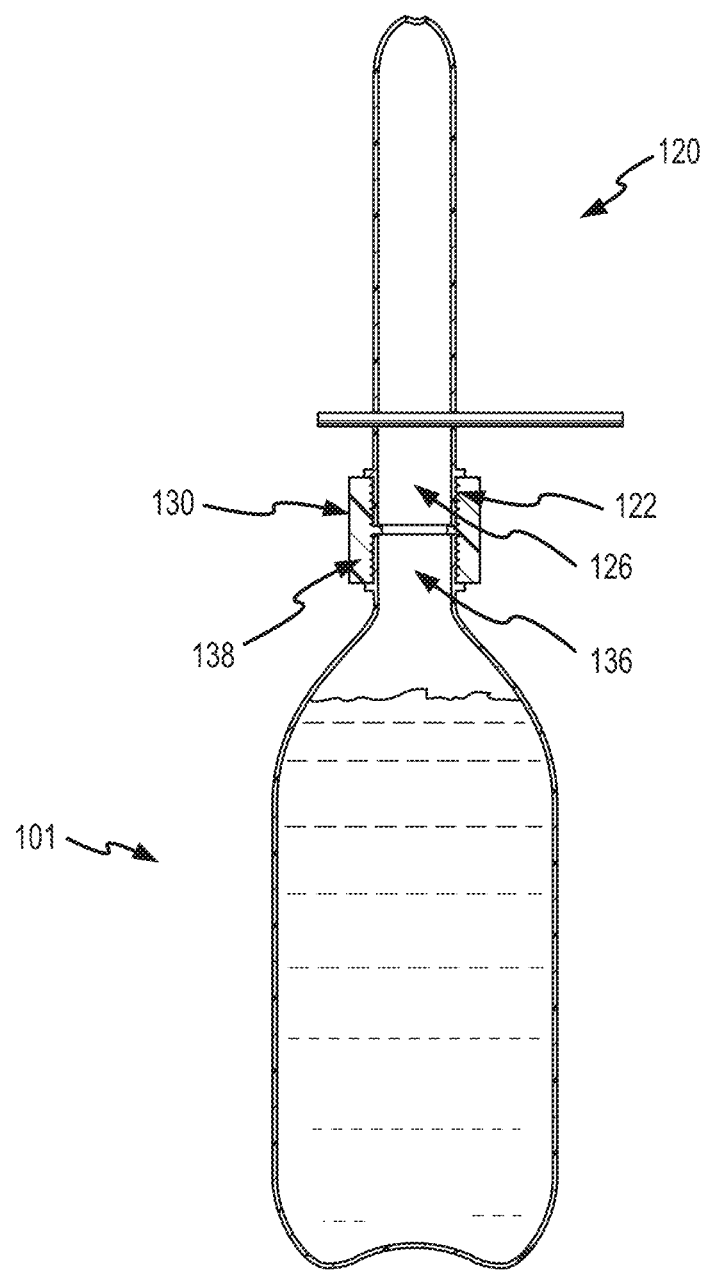
FIG. 5 is a cross-sectional view of an alternative apparatus with an externally threaded mouth attached to a bottle by an external coupling collar.

An alternative implementation of an eruption manipulation apparatus 120 is shown in FIG. 5, and includes an external coupling mechanism 130. In this alternative, the apparatus 120 has external threading 122 at its mouth portion 126, rather than the internal threading shown for mouth 106 in FIG. 1. This externally threaded mouth 126 may be lined up atop the mouth 136 of the soda bottle 101 and its external threads 138. An internally threaded coupling mechanism 130, internally threaded at and within both ends, may then provide for the externally threaded lower portion 126 of the apparatus 120 to be joined to the externally threaded neck of the soda bottle 128. In an implementation of this alternative apparatus 120, the apparatus may be formed from a soda bottle blank, i.e., an injection molded plastic part formed prior to a subsequent blow-molding finishing process which would create a full two-liter bottle. Note, in any of these or other alternatives, a commercial implementation may include a body portion pre-loaded with one or a plurality of catalytic solids, such as candy, with a cap or other closure member attached or attachable to close the mouth of the apparatus. In such a case, the triggering mechanism may be pre-set as well, or may be adapted to be set after purchase. Then, use may simply involve removal of the cap (or other closure device), setting the trigger if not pre-set, then attaching to an open fluid container containing an eruptible fluid. Triggering as described above may then provide for the eruption reaction.

Figure 6:
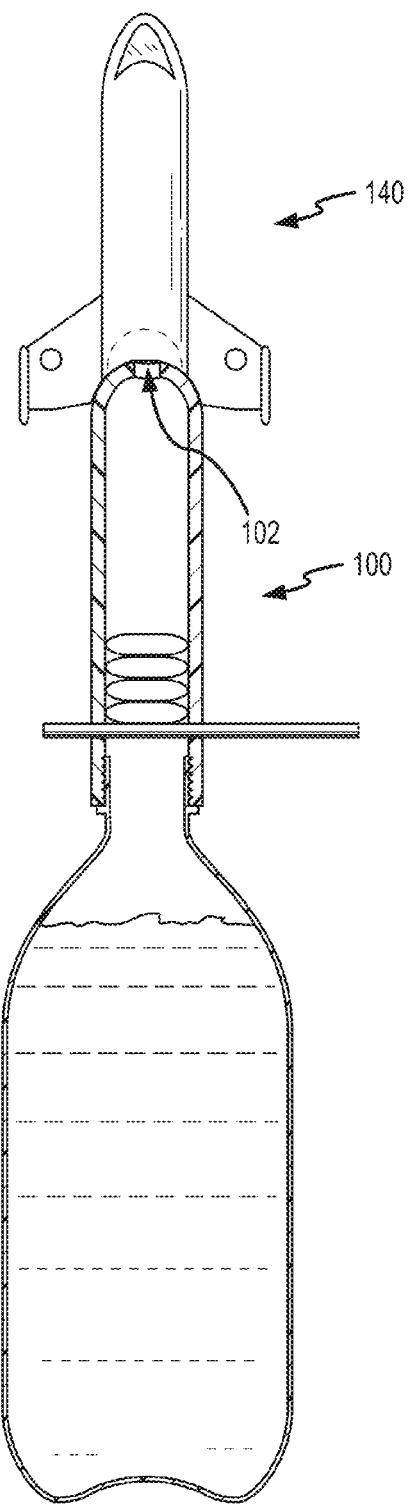
FIG. 6 is a cross-sectional view of an apparatus like that shown in FIG. 1 with a projectile toy mounted atop the apparatus.
Figure 7:
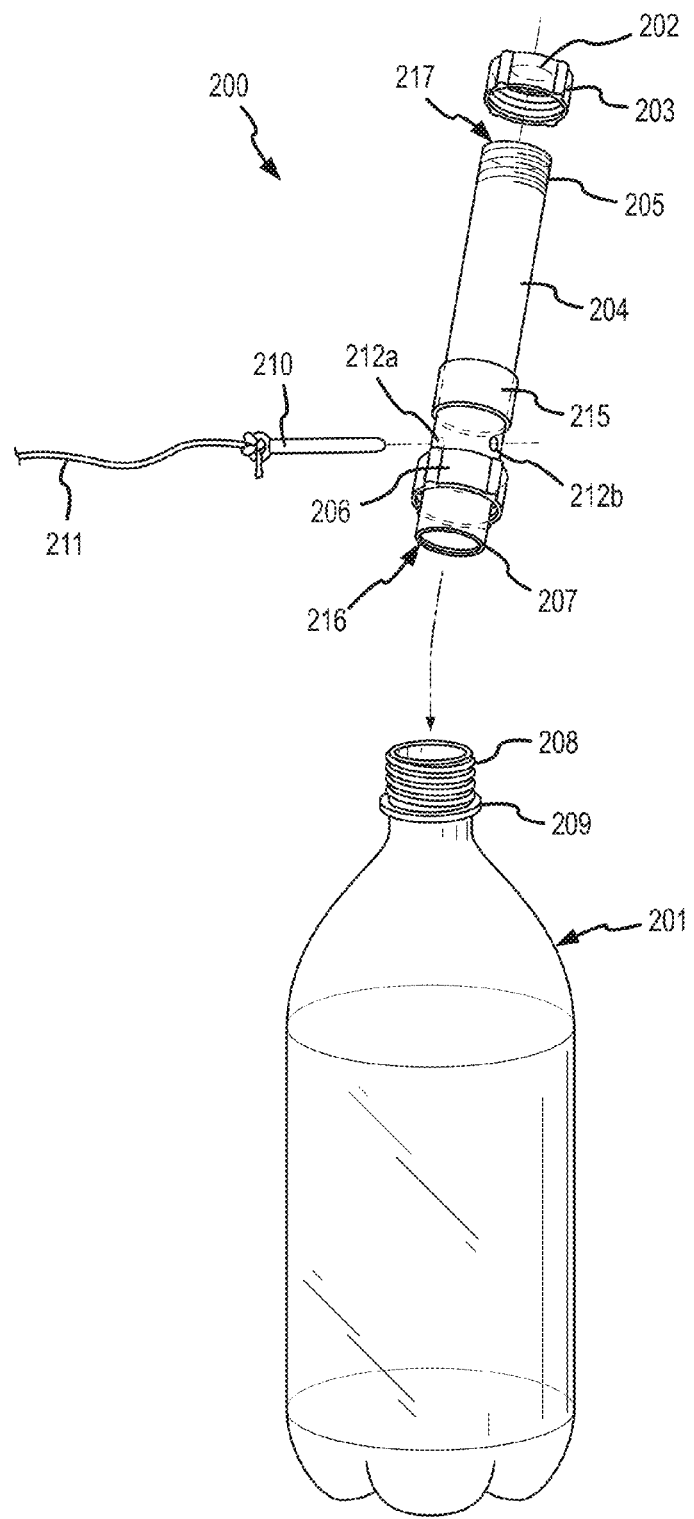
FIG. 7 is an isometric view of an alternative implementation of an apparatus for manipulation of a fluid dynamic eruption reaction.

An additional alternative implementation for use of an apparatus hereof is shown in FIG. 6 where a toy projectile 140 may be disposed on the apparatus 100. Upon commencement of a fluid eruption reaction, the upwardly-propelled soda traveling through the egress aperture 102 may create a propulsive force that may launch the projectile off the apparatus 100 and into the air.

An alternative eruption manipulation apparatus 200, is illustrated, for example in FIGS. 7-10, and may advantageously be used for conducting, observing and/or manipulating science experiments or presentations involving erupting fluids. The apparatus 200 may be particularly adapted for use with an otherwise conventional fluid container such as a soda bottle 201. As such the apparatus 200 may provide for controlled delivery of one or more eruption reaction solid articles 214 to an eruptible fluid 218 contained within the fluid container 201 (see more particularly the following description and FIGS. 8-10).

As may also have been the situation for the previously-described implementations, an apparatus 200 for manipulating or triggering a solid catalyst/dynamic fluid eruption reaction according hereto may, in addition to other optional features, include two primary parts: a solids container or body portion 204 for containing the solid catalyst, and a trigger device or mechanism 210 disposed in operative relation to the solids container or body portion 204. The body portion 204 may have a capacity for receiving one or a stack of a number of solid reaction-causing articles (see articles 214 in FIGS. 8-10, described further below). The trigger structure 210 may allow for either direct or remote deployment of the one or more solid reaction-causing articles 214 into a reactionary fluid 218. Typically, the apparatus 200 may be a beverage container attachment, and, the solid reaction-causing article can be a candy, e.g., one or more Mentos® mints (available from Perfetti van Melle Italia, S.r.l., Milan, Italy), and the reactionary fluid can be a carbonated soda beverage, e.g., Diet Coke® cola (available from the Coca-Cola Company, Atlanta, Ga., USA). Accessories and/or alternatives can be provided for use with the apparatus for directing and/or enhancing the nature and direction of the eruption. One or more methods for use of the apparatus are described further below.

As was generally true for the apparatus 100 of FIGS. 1-6, the apparatus 200 here shown includes a substantially cylindrical and substantially rigid body portion 204 with openings at both ends. At one end is an aperture 216, and, at the other end is a threaded aperture 217 to which may be attached a closure device 203 which has defined therein a small aperture 202, also referred to as a fluid egress opening 202. Body portion 204 may also be referred to as tubular or as a tube or a catalyst container 204 herein. A substantially rigid, internally threaded mouth portion 206 is included near the typically lower aperture 216 and is intended to couple the apparatus 200 to the threaded mouth 208 of a soda bottle 201 in operable communication therewith. Operable communication may include providing for the movement or transfer of one or more solids from the apparatus 200 into the interior of the container 201, and/or for communication of a fluid from the container to and through the apparatus 200. As such, the mouth portion 206 may be internally threaded as shown (see FIGS. 8, 9 and 10), in a fashion corresponding to or mating with the external threading 208 of the conventional soda bottle 201. A soda bottle collar or flange 209 may, inter alia, serve to limit the extent of the threaded connection of the eruption manipulation apparatus 200 to the soda bottle 201.

At the other end of the body portion 204, an external threading 205 may be disposed to receive corresponding internal threading of a cap member 203. A cap member 203 may then include one or more apertures 202 (one shown here) to allow egress of fluid therethrough. The apertures 202 may be in any of many shapes and/or sizes, and/or numerical combinations (many small holes would provide for more of a misting projection, whereas fewer larger holes may provide for larger, more focused geysers; smaller diameters of fewer openings providing for greater exit velocities, and/or higher eruptions, etc.). Moreover, the top portion of cap 203 may be integral with (as shown) or discrete from the threaded portion thereof. Hence, if discrete, as such a top portion may be when in a disc form, then the top portion may be interchangeable with other similarly sized and shaped discs/top portions. An upper lip on the cap member 203 (not shown) might be used to hold the interchangeable disc in place relative to the upper opening 217 of body portion 204.

Figure 8:
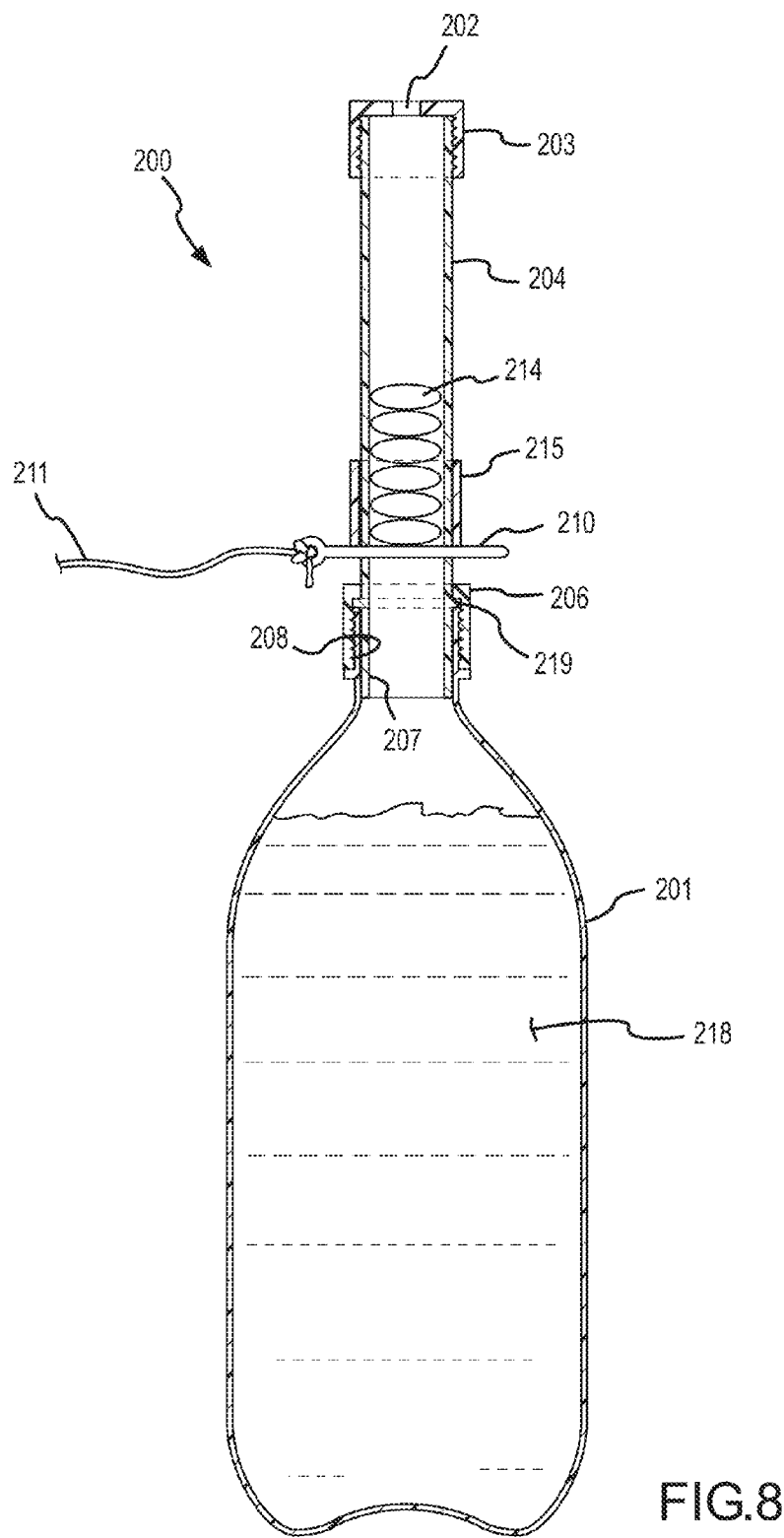
FIG. 8 is a cross-sectional view of an alternative apparatus like that shown in FIG. 7 with a retention/trigger component in place and the apparatus attached to a bottle.

A solids retention and/or trigger component 210, also alternatively referred to either as a retention component, a trigger component or as a retention trigger component 210, may be used to retain one or more solid catalyst articles 214 such as candy within the catalyst container 204 until a triggered release thereof is desired. As such, a retention trigger component 210 may be inserted into and/or through one or more laterally positioned holes 212, here shown as two holes 212a and 212b, one each disposed on either side of the apparatus 200 adjacent the threaded mouth portion 206. In an alternative implementation, a single hole 212 may be used so long as either: the triggering component is sufficiently configured to retain articles 214 without a second hole, or that the wall of the body portion 204 is thick enough at that point to provide a sufficient cantilevering effect for the elongated member of the trigger component when this is inserted therein. Note, an optional additional sleeve member 215 is shown in FIGS. 7-10. As shown in FIG. 8, this sleeve may rest on the triggering device 210 when the triggering device is disposed as shown in solids retaining position. The purpose and functionality hereof will be described further below.

Figure 9:
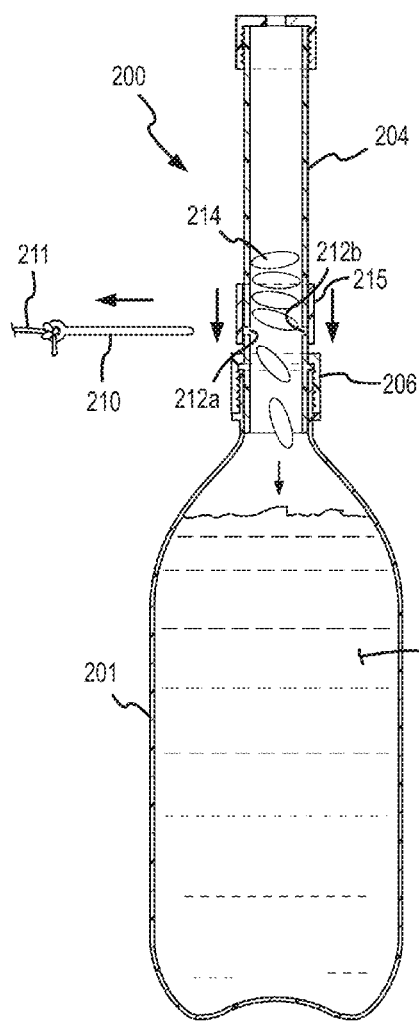
FIG. 9 is a cross-sectional view of an alternative apparatus like that shown in FIG. 7 with a retention/trigger component moved and a solid catalyst falling into an eruptible fluid within the bottle.
Figure 10:
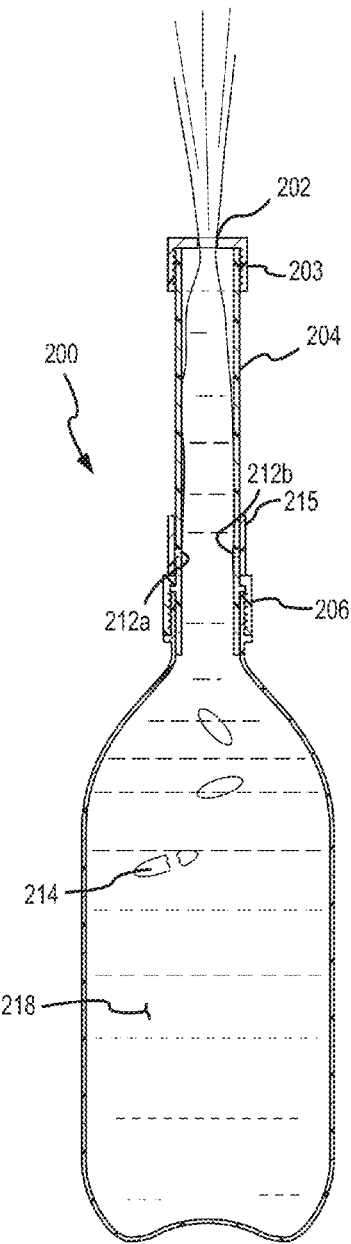
FIG. 10 is a cross-sectional view of an alternative apparatus like that shown in FIG. 7 illustrating the eruptive consequence of the solid catalyst/eruptible fluid reaction.

In an implementation hereof as shown for example in FIGS. 8, 9 and 10, an eruption manipulation apparatus 200 is attached to an eruptible fluid containing bottle 201, and is ready for use. Such a coupling of an apparatus 200 and a soda bottle 201 allows for the catalytic solid or solids 214, e.g., candy, to move or drop in substantially seamless transition from the container 204 to the soda bottle 201. However, prior to such an attachment of the apparatus 200 to the soda bottle mouth 208, the container or body portion 204 of the apparatus 200 is loaded with one or more catalytic solids 214, such as certain types of candy, see further description hereof below. These one or more solids 214 may be inserted into and stacked within the body portion 204 through either aperture 216 or 217. The trigger component 210 may then be inserted (or have been pre-inserted if loading through aperture 217) through the one or more holes 212 (212a, 212b), and by thus extending into and in many cases projecting through the apparatus 200, this secures the catalytic solids 214 in place within the apparatus 200. If not priorly appropriately positioned, cap member 203 may then be placed in operative position, e.g., screwed into place adjacent the upper aperture 217. The apparatus 200 may then be positioned appropriately and coupled to the mouth 208 of the soda bottle 201 using internally threaded collar 206 to engage the threaded mouth 208. This isolates the solid catalyst(s) in a secured and readily deployable position above the eruptible fluid 218, e.g., soda, within the bottle 201. Note, an extended internally positionable sleeve 207 may be adapted to be inserted within the mouth 208 of the bottle 201 to smooth the transition area and ensure little or no fluid leakage at the threaded coupling of the apparatus body 204 to the bottle 201.

A protruding portion of the trigger component 210 (here, the end connected to the string 211) may then be directly or remotely pulled to effect removal or at least substantial withdrawal of the trigger component from the container 204 as shown in FIG. 9 (complete withdrawal is not required). Once the trigger component 210 is moved in such fashion, the catalytic solid or solids 214 fall downward through the aperture 216 and into the eruptible fluid 218. Once the catalytic solids 214 contact the fluid 218, the eruption reaction begins, as illustrated in FIG. 10. More particularly, as the catalytic solids 214 fall into and disperse within and through the fluid 218, gases are generated at a high rate, and the forces of the gas generating reactions cause the eruptible fluid 218 to quickly flow or move upward and outward through the mouth 208 of the bottle and into and through the apparatus 200 and ultimately exit through the aperture 202 into the outer environment. As introduced above, the aperture 202 can be modified in shape and size to direct propulsion of the soda upward and/or outward in many alternative configurations. A plurality of holes or one or more transverse slices could alternatively be used as well. Indeed, one or more holes could be disposed in the lateral sidewalls 204 as well.

Note, either a direct or a more remote triggering operation may be used to move the trigger component 210. For example, an experimenter may manually grasp the protruding portion of the trigger component 210 and pull, or the protruding portion may be otherwise moved as by or through connection of an elongated string 211 or other mechanical connection member (neither shown) to allow the experimenter to deploy the catalyst from a relatively remote location away from the reaction to avoid direct or indirect contact with the eruption.

As introduced above, a sleeve 215, here shown external of body portion 204 and slidable relative thereto, may be disposed to slide downward upon removal of the triggering component 210. This action is shown in FIG. 9: upon the removal of the triggering mechanism 210, the sleeve 215 slides down to and comes to rest upon the collar 206. In so doing, the sleeve 215 can effectively cover the trigger holes 212a and 212b, thereby preventing or substantially reducing fluid egress therethrough. Though not shown, an internal sleeve or alternative structure could be used similarly. Other means could include spring-loaded flaps or the other hole closure devices (not shown) which engage upon the removal of the trigger.

Manufacture of a device 200 may be accomplished in many fashions. In one, an appropriately-sized tube or tubing may first be obtained for the body portion 204. One or more trigger holes 212 may be formed. An external sleeve of appropriate dimension/diameter may be added. A collar 206 formed with internal threading to match/correspond with a conventional fluid container 201 may also be put in place on/around the external surface of the tube 204 (a notch and mating protrusion engagement may be used (the notch formed on either the tube or internal to the cap with the mating protrusion formed in the opposing member) (a lip 219 formed on or otherwise fixed on the external surface of the tube 204 (see FIG. 8) may assist, particularly if the collar is not integrally formed with or otherwise affixed to the outer surface of tube 204; e.g., if it is freely rotatable relative to the tube 204). A cap member 203 with any variation of hole sizes, placements and/or numbers may then be formed and put in place. The connection may be threaded for simple removal and attachment. Otherwise, a press fit may be used, or perhaps merely a notch and mating protrusion engagement may be used (the notch formed on either the tube or internal to the cap, with the mating protrusion formed on the opposing member). For the optional notch engagements, a pre-formed tube drafted into service here may allow for relatively simple notch formation on the exterior surface thereof. Corresponding protrusions could thus be formed on either or both of the collar 206 and the cap 203 to engage the appropriate notches on the surface of body portion 204. Substantially rigid yet minimally pliable or resilient materials may be used to assist in bringing the respective parts into operable orientation.

Figure 11:
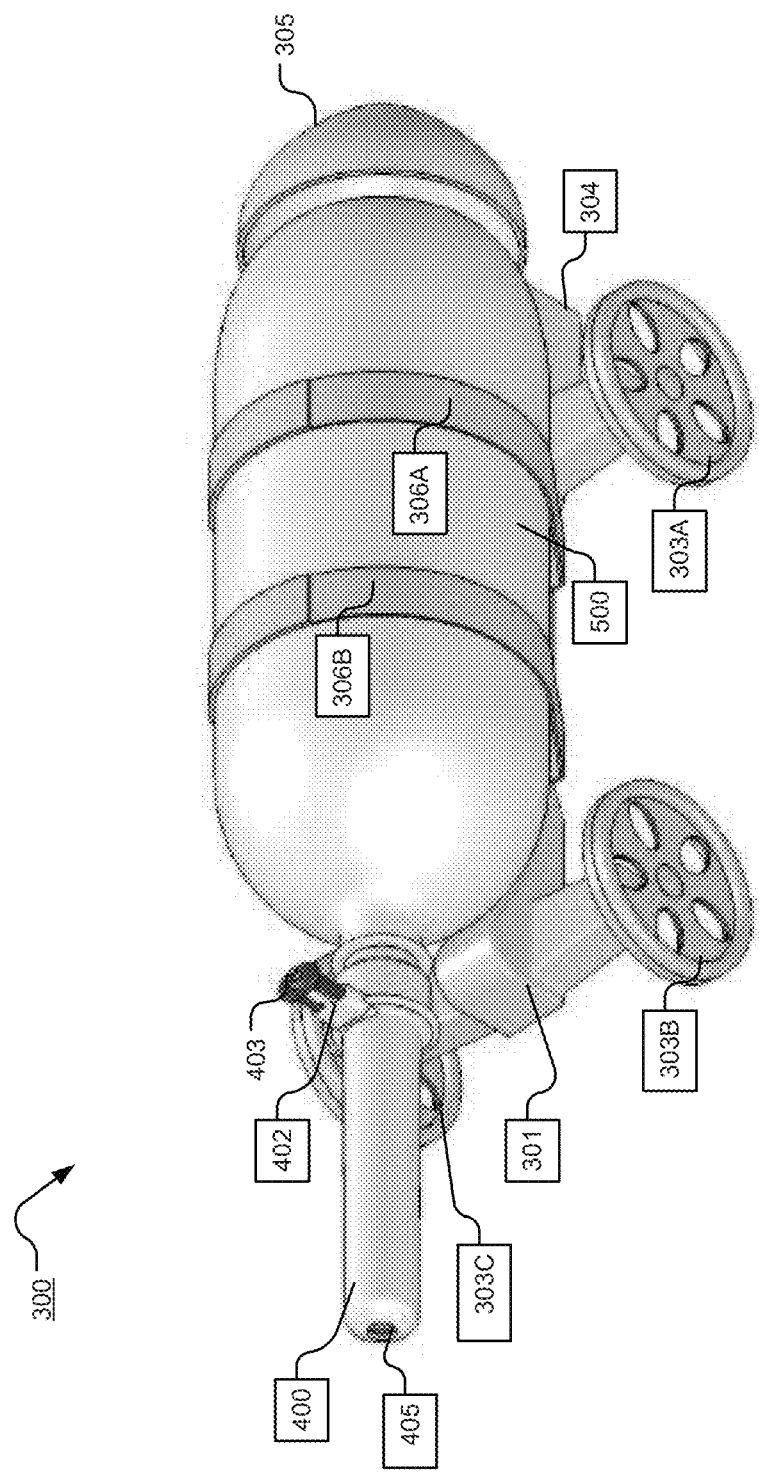
FIG. 11 is a side view of an alternative apparatus like that shown in FIG. 1 with a retention/trigger component in place and the apparatus attached to a bottle and with a chassis operably attached to the bottle.

As presented in FIG. 11, the apparatus 300 can alternately include a chassis 301 and wheels 303A, 303B, 303C (and 303D, not shown) for movement of the bottle and apparatus. The apparatus 300 can be operably attached to the bottle 500. The chassis 301 is further optionally attached to a bottle end cup 305 which can optionally be attached to a coupler 304 between the chassis 301 and the bottle end cup 305. The bottle 500 can optionally be attached to the chassis 301 via attachments 306A, 306B, which may be straps optionally including VELCRO™, cables, ties, chains, and the like. There may be one, two, three, four, five, or more attachments like 306A and 306B. The wheeled apparatus 300 as shown in FIG. 11 shows the chassis 301 operably attached to wheels 303A, 303B, 303C (with 303D not shown in FIG. 11 but shown in FIG. 12, described hereinbelow). The bottle 500 may be coupled to an eruption manipulation apparatus 400, holding a solid catalyst 600. The eruption manipulation apparatus 400 optionally includes a trigger component 403 that optionally can be operatively connected to an external portion or a trigger attachment 401 attached or fixed to the apparatus 400. The propulsion for the apparatus 300 is provided by eruptible fluid exiting a hole 405 at a first end of the eruption manipulation apparatus 400.

Figure 12:
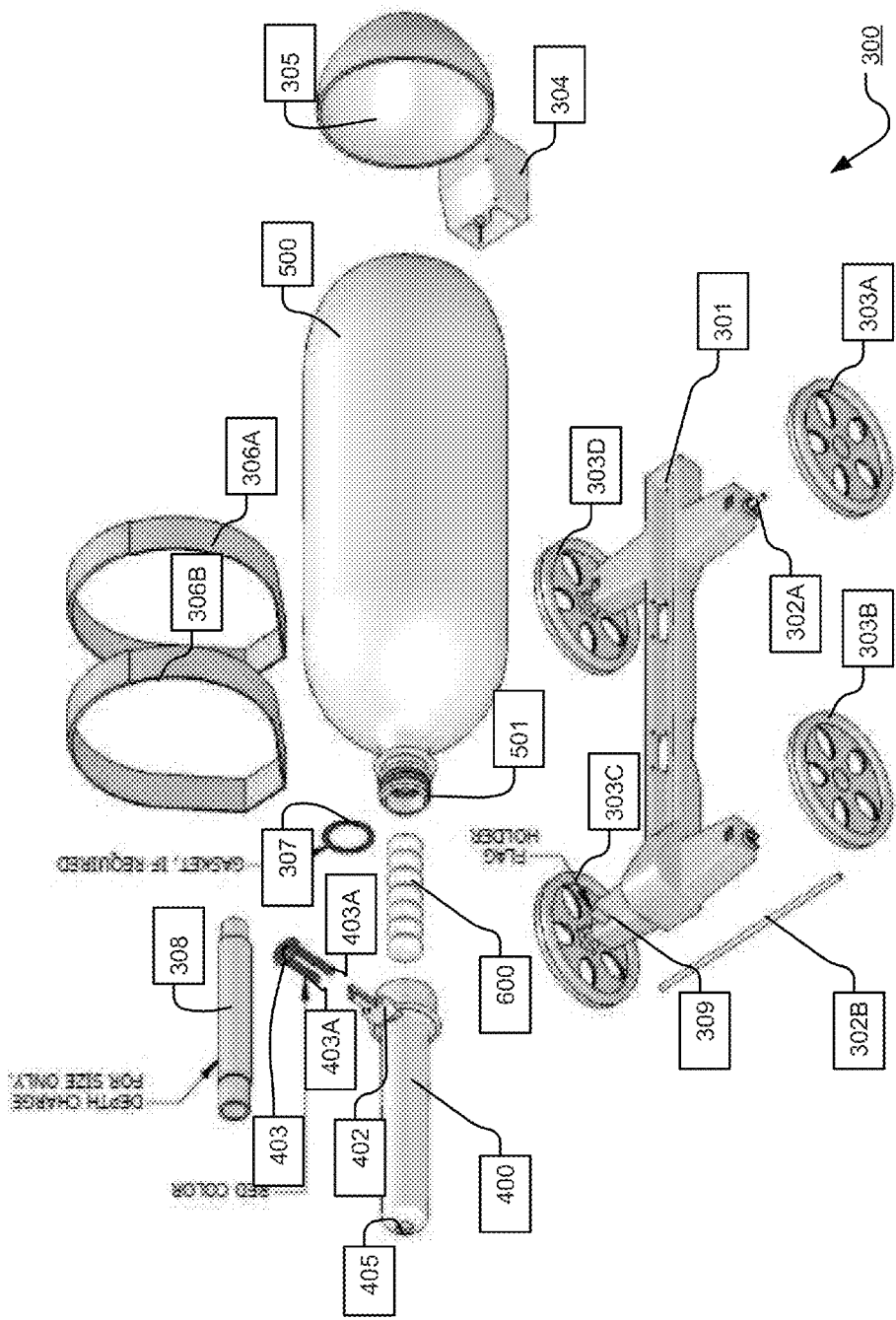
FIG. 12 is an isometric, exploded view of an apparatus like that shown in FIG. 12.

The exploded view of the apparatus 300 as shown in FIG. 12 shows the chassis 301 operably attached to axles 302A and 302B, which in turn are operably attached to wheels 303A, 303B, 303C, and 303D. In FIG. 12, wheels 303A and 303D are operably attached to axle 302A, and wheels 303B and 303C are operably attached to axle 302B. In alternative implementations, the present development can comprise two, three, four, five, six, eight, or more wheels, and one, two, three, four, or more axles. The eruption manipulation apparatus 400, having a hole 405 at a first end, for manipulating or triggering a solid catalyst 600/dynamic fluid eruption reaction, is operably attached or fixed at a second end to the mouth 501 of the bottle 500, optionally using a gasket 307. The apparatus 400 optionally includes a trigger component 403 that optionally can be operatively connected to a trigger attachment with detents 402 attached or fixed to the apparatus 400 holding the solid catalyst 600. The trigger component 403 may have two prongs 403A and 403B. If the solid catalyst 600 has a diameter or circumference substantially smaller than the inner circumference of the apparatus 400, then a depth charge 308 can be provided as removably inserted inside the apparatus 400 to accommodate the smaller dimensions of the solid catalyst 600. The coupler 304 and the attachments 306A, 306B are also shown in an exploded view. The chassis 301 can optionally further include a flag holder 309.

As shown in FIG. 13A-B, the trigger components 403 and detent portions 402 can form a portion of the apparatus 400. In an alternative implementation, as shown in FIG. 13A, the detent portion 402 can further comprise one or more detents 402A, 402B, to hold the trigger component 403 inserted into the inner diameter of the trigger portion 403 of the apparatus 400. The trigger component 403 is intended to hold the solid catalyst 600 in place prior to its release into the reactionary fluid inside the bottle 500. As shown in FIG. 13C, the one or more detents 402A, 402B optionally hold the trigger component 403 outside of the inner diameter of the apparatus 400. The detents 402A, 402B hold the trigger component 403 in place and their size may be adjusted as required for the strength of the detent. The trigger component may move from a first, employed position as indicated in FIG. 13A to a second, deployed position as indicated in FIG. 13B. The detents 402A, 402B may stop the trigger component 403 so that in the second, deployed position indicated in FIG. 13A, the trigger component does not detach from the eruption manipulation apparatus 400 after the solid catalyst is mixed with the reactionary fluid in the bottle 500 and the eruptive reaction is released from the bottle 500 through the apparatus 400 and through the hole 405 at the end of the apparatus 400 to provide propulsion. The apparatus 400 can be used with or without a propulsion toy.

One or more advantages may potentially be derived from an apparatus such as that described here. For example, such an apparatus may be convenient and easy to use. In one specific sense, the structure of the apparatus has just two (2) main parts, i.e., the apparatus body and the trigger component. As a result, individuals with various skill levels can easily assemble the apparatus in preparation for conducting an experiment or presentation according hereto. Further, suitable low-cost, commercially available, plastic or wooden materials can be used to make the apparatus and the trigger component.

Having described a variety of implementations, numerous other alternative implementations or variations might also and/or alternatively be made. For example, it was described that the apparatus has a cylindrical, rigid composition. However, this was merely some illustrative examples. Alternative implementations of the apparatus can be variants on the cylindrical shape so that the space within which the candy may be held can accommodate various configurations and quantities of candy.

The present apparatus has been described in detail including various implementations thereof. However, it should be appreciated that those skilled in the art, upon consideration of the present disclosure, may make modifications and/or improvements on the apparatus hereof and yet remain within the scope and spirit hereof as set forth in the following claims.

What is claimed is:
1. An apparatus for an eruption reaction involving a catalytic solid and an eruptible fluid, the apparatus comprising:
   a substantially cylindrical body portion for holding a catalytic solid, the body portion having
     a mouth at a first end and
     a fluid egress opening at a second end;

a hole for a trigger mechanism adjacent to the mouth at the first end thereof; and, the body portion further comprising an external portion fixed at one end to the side of said body portion adjacent the mouth at the first end and within which at least a portion of a trigger mechanism is movable;

wherein the body portion is adapted to be coupled at the mouth thereof to the opening of a container of an eruptible fluid;

a trigger mechanism operatively connectable to the body portion, the trigger mechanism adapted to alternately retain and release the catalytic solid relative to the body portion; the trigger mechanism is an elongated member moveably inserted within the hole in the body portion adjacent to the mouth thereof; and the apparatus operably connectable to the container of an eruptible fluid, wherein the withdrawal of the trigger mechanism results in a release of the catalytic solid into the eruptible fluid and a mixing of said catalytic solid with said eruptible fluid, creating a propulsive force.

2. An apparatus as recited in claim 1, wherein the body portion is one of: (i) internally threaded within the mouth at the first end thereof; and (ii) externally threaded about the mouth of the first end thereof.

3. An apparatus as recited in claim 1, wherein the eruptible fluid container is a soda bottle.

4. An apparatus as recited in claim 1, the body portion is externally threaded about the mouth at the first end thereof.

5. An apparatus as recited in claim 4, further comprising a discrete, internally threaded coupling device adapted to be coupled to the body portion at the externally threaded portion thereof.

6. An apparatus as recited in claim 5, wherein the internally threaded coupling device is further also adapted to be coupled to the mouth of a fluid container, to provide for a coupling of the body portion of the apparatus to the eruptible fluid container in operable communication therewith.

7. An apparatus as recited in claim 1, wherein the catalytic solid is one or both of a candy and a Mentos® mint.

8. An apparatus as recited in claim 1, wherein the eruptible fluid is one or more of a carbonated fluid, a soda and a Diet Coke® cola.

9. An apparatus as recited in claim 1 further comprising a removable closure member adapted to provide for pre-loading the body portion with a catalytic solid.

10. An apparatus as recited in claim 1, further comprising a chassis operatively attached to the apparatus that allows said apparatus to roll upon a surface due to said propulsive force.

11. An apparatus as recited in claim 10, wherein the chassis further comprises at least three wheels.

12. An apparatus as recited in claim 10, wherein the chassis is attached to the container of the apparatus via attachments.

13. An apparatus as recited in claim 12, wherein the attachments are one or more of VELCRO™, cables, ties, and chains.

14. An apparatus as recited in claim 1, wherein the external portion includes one or more detents.

15. An apparatus as recited in claim 1, further comprising a depth charge inserted inside the apparatus body portion to accommodate the dimensions of the solid catalyst if the solid catalyst has a diameter or circumference substantially smaller than the inner circumference of the body portion.

16. An apparatus as recited in claim 1, further comprising a flag holder.

17. An apparatus as recited in claim 1, further comprising a propulsion toy.

18. An apparatus as recited in claim 1, wherein said external portion further comprises one or more stops at one or more ends that prevent the elongated member from detaching from said external portion.

19. A method for an eruption reaction involving a catalytic solid and an eruptible fluid, the method comprising:

disposing a catalytic solid in a cylindrical body portion, the body portion having a mouth at a first end and a fluid egress opening at a second end;

a hole for a trigger mechanism adjacent to the mouth at the first end thereof; and, the body portion further comprising an external portion fixed at one end to the side of said body portion adjacent the mouth at the first end and within which at least a portion of a trigger mechanism is movable;

withdrawing a trigger mechanism and thereby releasing the catalytic solid into the eruptible fluid and mixing of said catalytic solid with said eruptible fluid;

the trigger mechanism being adapted to alternately retain and release the catalytic solid relative to the body portion; the trigger mechanism is an elongated member moveably inserted within the hole in the body portion.

20. The method according to claim 19 wherein the apparatus is operably connectable to a container of an eruptible fluid.

* * * * *